UNITED STATES PATENT OFFICE.

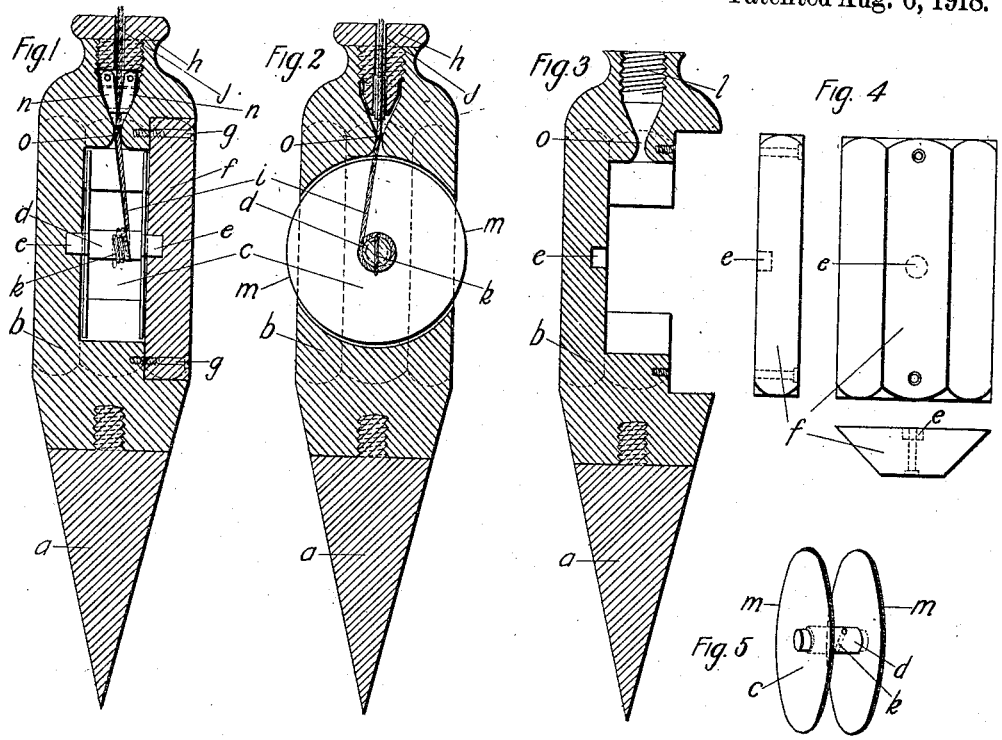
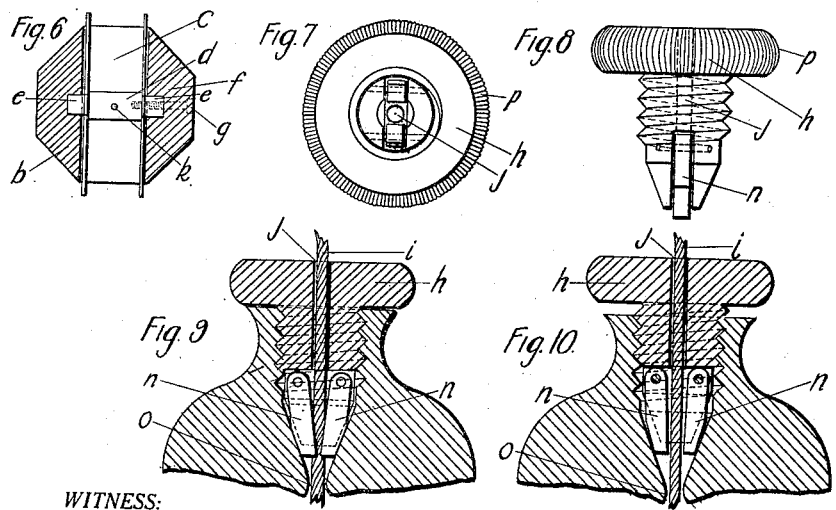

JOHN ALEXANDER ARMOUR, OF BALTIMORE, MARYLAND.

PLUMB-BOB.

1,274,662.

Specification of Letters Patent.     Patented Aug. 6, 1918.

Application filed June 12, 1917.   Serial No. 174,196.

*To all whom it may concern:*

Be it known that I, JOHN A. ARMOUR, a citizen of the United States, residing at 1218 William street, in the city of Baltimore and State of Maryland, have invented a new and useful Plumb-Bob, of which the following is a specification.

My invention relates to improvements in a plumb bob in which a pulley is so installed that a plumb line may be wound around the axle of the pulley, and held fast at any place on the plumb line by a pair of teeth in a screw inserted in the top of the plumb bob. The object of my invention is to provide an attachment for adjusting the plumb line at point of contact or base without necessitating a readjustment of the plumb line at the head or apex.

I attain this object by the mechanism illustrated in the accompanying drawing in which:—

Figure 1, is a vertical section of the entire mechanism; Fig. 2, a vertical section of the entire mechanism, showing lateral view of pulley, plumb line and screw lock in their relation to plumb bob; Fig. 3, a vertical section of basic parts of plumb bob, including skeleton body and point attached by threaded dowel; Fig. 4, two sections and one plan view of side plate; Fig. 5, perspective view of pulley; Fig. 6, sectional plan view of pulley and its relation to plumb bob; Fig. 7, plan view of screw lock from bottom; Fig. 8, detailed lateral view of screw lock, string outlet, and teeth neutral; Fig. 9, enlarged detailed view of plumb bob head, string inserted, screw lock tightened, string clutched; Fig. 10, enlarged detailed view of plumb bob head, string inserted, screw raised and teeth released.

Numerals refer to figures and similar letters refer to similar parts throughout the several views.

The plumb bob proper is composed of a round steel point "$a$" attached by a screw dowel to octagonal body "$b$" and brass side plate "$f$" held in position by two screws "$g$". The head of the plumb bob is bored and threaded. The bore is tapered toward the center and ends in a small hole to admit plump line at "$o$". Pulley "$c$" is inserted in the body "$b$", with axle "$d$" resting in axle holes "$e$". Side plate "$f$" which also contains an axle hole "$e$" for the other end of axle of pulley is attached with two screws "$g$", adjustment made neat, but to admit of revolution of pulley on axle.

Screw lock "$h$" is a round brass plug threaded to fit the threaded bore "$l$", with a cord aperture "$j$" running longitudinally through the center of the plug. The head of the screw lock "$p$" is extended and milled, to facilitate gripping. The end of the plug is beveled off to fit the graduated bore in the plumb bob head ending at "$o$". Two teeth are suspended on rivets in a longitudinal recess made in the end of the plug, one tooth on each side of the cord aperture "$j$", a little longer than but conforming in shape to the beveled sides of the plug.

The operation of the device is as follows; insert the screw lock "$h$" on threads, run plumb line through aperture "$j$" in plug and make fast through hole "$k$" in axle of pulley. Wind in slack line with thumb and fingers on "$m$" until pulley is full. Fasten free end of plumb line to object from which plumb bob is to be suspended. Let out line until steel point "$a$" is over the desired plumb mark.

The plumb bob may then be manipulated by taking bob in one hand, holding over place where plumb point is desired, turn pulley "$c$" with thumb and index finger of same hand on "$m$" until surplus slack line is taken up. Turn screw lock "$h$" down until the two teeth "$n$" are forced together and grip the plumb line by coming in contact with beveled bore in the top of plumb bob.

I claim:

1. A plumb bob comprising a body having an opening in one end, the walls of said opening tapering toward the center of said body and terminating to define an axially disposed aperture, a pulley mounted within said body for rotation, a plug threaded within said opening, and a pair of pivoted clamping elements carried by the plug and having a tapered portion coöperating with the taper in said opening whereby said elements are moved into gripping relation when the plug is moved within the opening.

2. A plumb bob comprising a body having an open center, and a bore at one end, the walls of said bore being tapered toward the center of the body and terminating to define a restricted passage establishing communication between the center and said bore, a pulley journaled within said center, a plug threaded within said bore, said plug being bifurcated at one end, clamping elements pivoted within said bifurcation, and said elements having an inclined portion coöperating with the taper of said bore, whereby said elements are moved into clamping relation when the plug is moved within said bore.

JOHN ALEXANDER ARMOUR.